United States Patent [19]

Kurihara

[11] Patent Number: 5,106,287
[45] Date of Patent: Apr. 21, 1992

[54] MOUTHPIECE DISCRIMINATING DEVICE FOR ROTARY ROLL EXTRUDER

[75] Inventor: Takashi Kurihara, Kodaira, Japan

[73] Assignee: Bridgestone Corporation, Tokyo, Japan

[21] Appl. No.: 670,104

[22] Filed: Mar. 15, 1991

[30] Foreign Application Priority Data

Mar. 16, 1990 [JP] Japan .................. 2-64433

[51] Int. Cl.⁵ .............................. B29C 47/32
[52] U.S. Cl. .................. 425/169; 425/183; 425/186; 425/190; 425/194
[58] Field of Search ............ 425/135, 169–172, 425/183, 185, 186, 190, 194, 224, 374, 466

[56] References Cited

U.S. PATENT DOCUMENTS

| 3,103,006 | 9/1963 | Anthony | 340/825.23 |
| 4,518,338 | 5/1985 | Hehl | 425/183 |
| 4,911,631 | 3/1990 | Harada et al. | 425/183 |
| 4,950,145 | 8/1990 | Zanetos et al. | 425/171 |

FOREIGN PATENT DOCUMENTS

| 0316122 | 5/1989 | European Pat. Off. | |
| 1553160 | 12/1967 | France . | |
| 2389481 | 4/1978 | France . | |
| 58-222828 | 12/1983 | Japan | 425/169 |
| 61-182740 | 8/1986 | Japan . | |
| 1233365 | 5/1971 | United Kingdom . | |

Primary Examiner—Tim Heitbrink
Assistant Examiner—James P. Mackey
Attorney, Agent, or Firm—Sughrue, Mion, Zinn, Macpeak & Seas

[57] ABSTRACT

A mouthpiece discriminating device for a rotary roll extruder serves to distinguish different kinds of exchangeable mouthpieces from one another without relying upon visual inspection. The device includes a plurality of magnets embedded in the mouthpiece along its edge and aligned with each other in a direction of passage for the mouthpiece. The poles of the magnets are arranged as coded information uniquely determined in accordance with kind of the mouthpiece. A detector element provided along the passage detects the magnetic fields of the magnets upon movement of the mouthpiece along the passage. A signal processing unit discriminates the kind of the mouthpiece based on output signals of the detector element representing the magnetic fields detected.

4 Claims, 3 Drawing Sheets

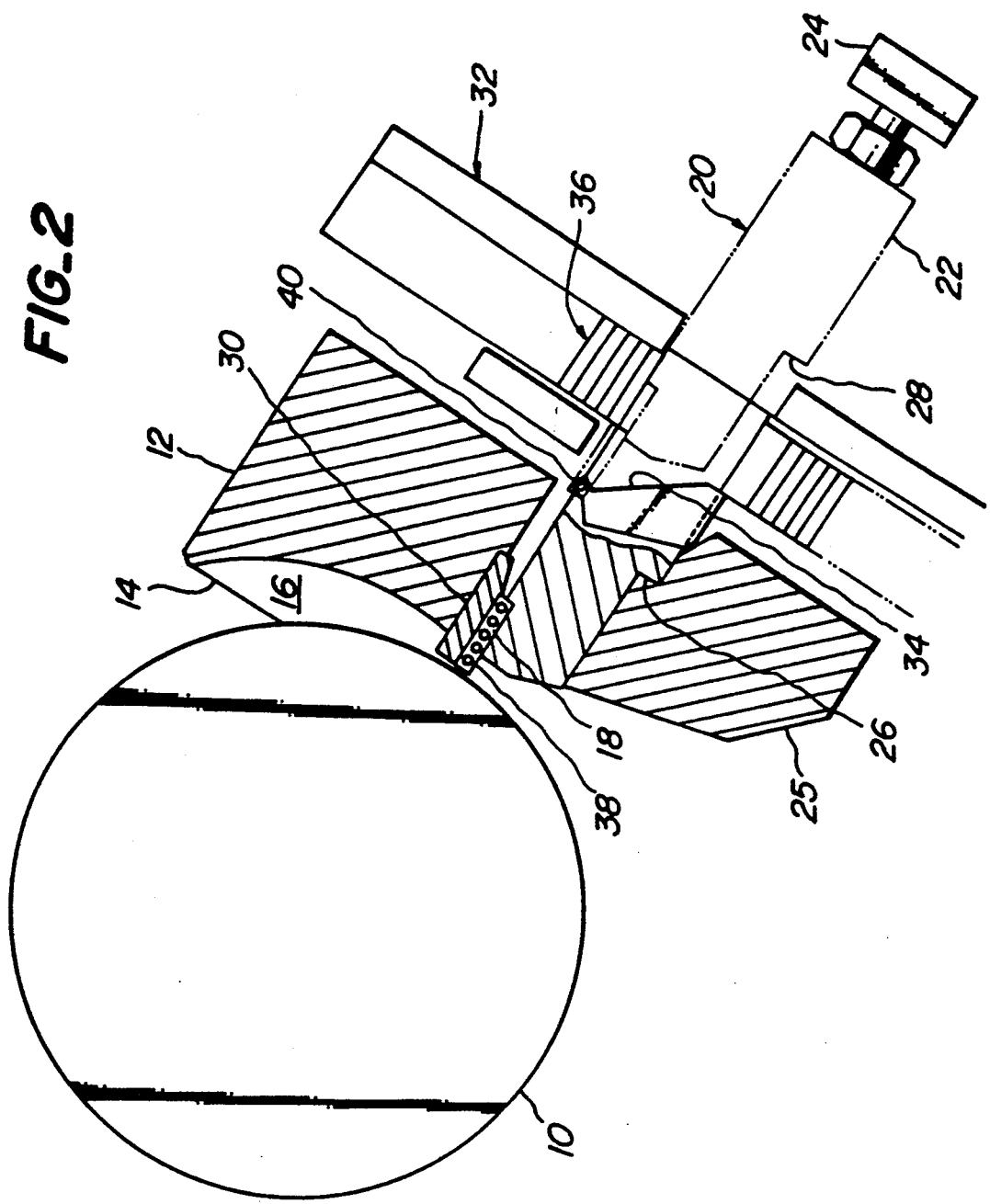

FIG_3a
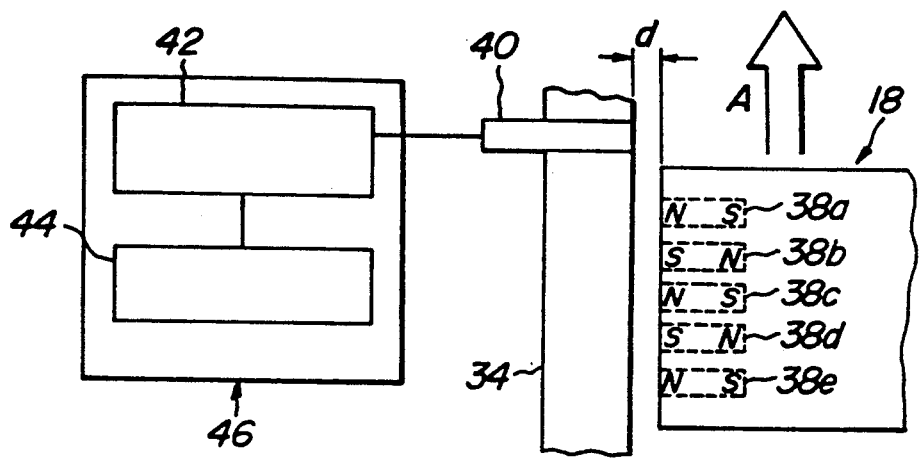
FIG_3b
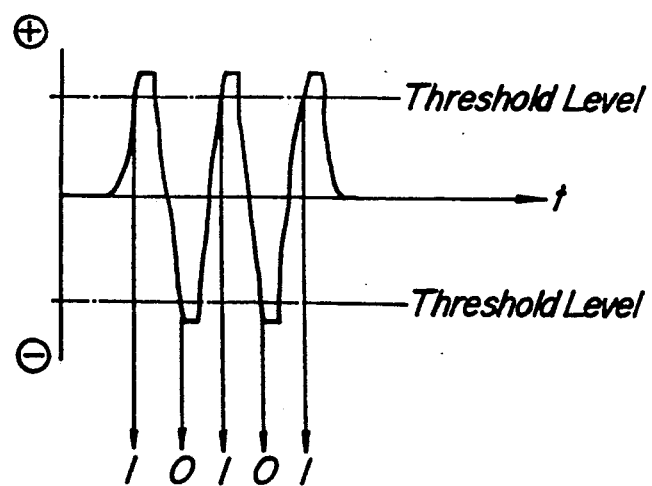

MOUTHPIECE DISCRIMINATING DEVICE FOR ROTARY ROLL EXTRUDER

BACKGROUND OF THE INVENTION

The present invention relates generally to a rotary roll extruder for extruding material, such as raw rubber from a notch of a mouthpiece in cooperation with an outer circumferential surface of a cylindrical extrusion roll to form extrusions in desired shapes. More particularly, it pertains to a mouthpiece discriminating device for such a rotary roll extruder.

One example of a hitherto used rotary roll extruder is shown in FIG. 1. This extruder includes a cylindrical rotary roll 1, a mouthpiece 2 arranged in opposition to the roll 1, and a die head 3 through which raw rubber is discharged from the extruder. The raw rubber is extruded through a notch of the mouthpiece 2 in cooperation with the outer circumferential surface of the rotary roll 1 to form extrusions 4. In the illustrated example, a restraining plate 5 serves to restrain the mouthpiece 2 in position.

With such an extruder, however, since the mouthpiece 2 is held by the restraining plate 5 as described above, it must be removed each time mouthpieces are exchanged. In order to avoid such troublesome operation, it may be feasible to use mouthpieces which are movable toward and away from the rotary roll in a radial direction thereof and which can be held at a predetermined position relative to the rotary roll 1.

In an extruder which includes exchangeable mouthpieces cooperating with the outer circumferential surface of the extruder roll, although there are some mouthpieces with characteristic appearance which can be easily distinguished from others by visual inspection, it is generally difficult for workers to quickly and correctly distinguish different kinds of mouthpieces from one another because of their inconspicuous differences in appearance. Moreover, discrimination of different kinds of mouthpieces relying upon visual inspection is not only troublesome, but also prone to error in selecting correct mouthpieces.

SUMMARY OF THE INVENTION

It is an object of the present invention to provide a novel mouthpiece discriminating device for a rotary roll extruder, which is capable of distinguishing respective mouthpieces in a reliable manner without requiring visual inspection, thereby to eliminate the above-mentioned disadvantages of the prior art.

To this end, the present invention provides a mouthpiece discriminating device for a rotary roll extruder which includes a cylindrical extrusion roll, an exchangeable mouthpiece movable along a predetermined passage and having a notch which can be brought into cooperation with an outer circumferential surface of the rotary roll, and holder means which can be advanced toward the extrusion roll and retracted away therefrom, for holding in its advanced position the mouthpiece in a predetermined position relative to the rotary roll such that raw rubber or the like material can be extruded along with rotation of the rotary roll, from the notch of the mouthpiece.

The discriminating device according to the present invention comprises a plurality of magnets embedded in the mouthpiece along at least one edge thereof and aligned with each other in a direction of the passage, such that their poles are arranged as coded information uniquely determined in accordance with kind of the mouthpiece. The device further comprises a detector element provided along the passage, for detecting magnetic fields of the magnets upon movement of the mouthpiece along the passage, and for generating output signals representing the magnetic fields detected, as well as a signal processing means for discriminating the kind of the mouthpiece based on the output signals generated by the detector element.

With the mouthpiece discriminating device of the above-mentioned arrangement, a desired mouthpiece is advanced along the passage toward the extrusion roll after the mouthpieces have been exchanged prior to formation of extrusions. The detection element arranged along the passage of the mouthpiece detects the magnetic fields of the magnets embedded along the edge of the mouthpiece. Thus, by arranging the polarities of the respective magnets in different manners for different mouthpieces, as coded information uniquely determined in accordance with the kind of mouthpiece, it is readily possible to distinguish and identify the individual mouthpieces from one another e.g. by comparing the detected signals with previously memorized signals of the respective mouthpieces, without requiring visual inspection.

The present invention will be more fully understood by referring to the following detailed specification and claims taken in connection with the appended drawings.

BRIEF DESCRIPTION OF THE DRAWINGS

FIG. 2 is a schematic sectional view illustrating one embodiment of the mouthpiece discriminating device according to the present invention;

FIG. 3a is a schematic view illustrating the operation of the device shown in FIG. 2; and FIG. 3b is an explanatory view illustrating detection signals from the detection element of the device shown in FIG. 2.

DESCRIPTION OF PREFERRED EMBODIMENTS

Figure 1:
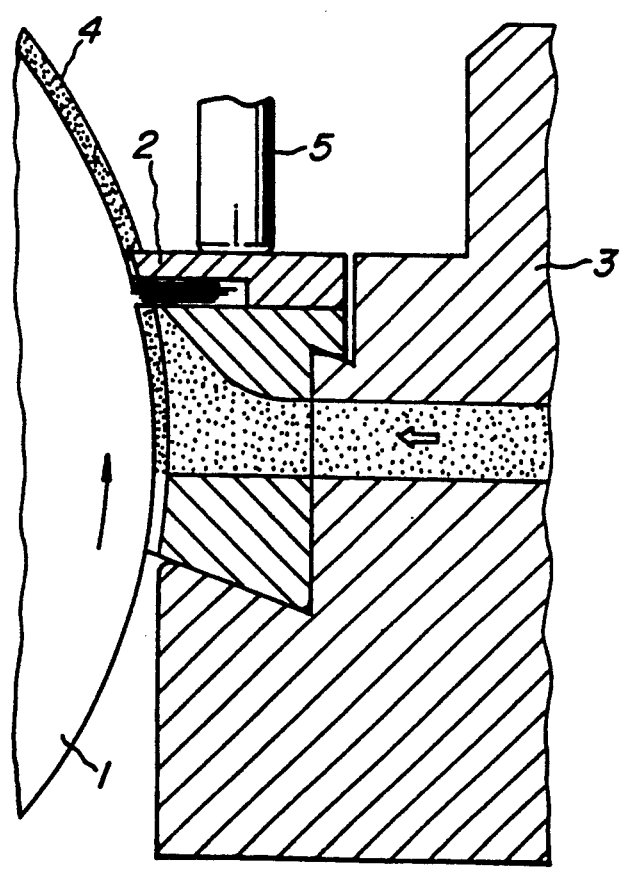
FIG. 1 is an explanatory view illustrating a rotary roll extruder of the prior art.

One embodiment of the present invention will be explained below with reference to FIG. 2 which illustrates, partially in section, a rotary roll extruder incorporating the mouthpiece discriminating device according to the invention. The extruder includes a cylindrical extrusion roll 10 and a chamber block 12 arranged opposite to the roll 10. The chamber block 12 is formed with a recess having an arcuate cross-section cooperating with an outer circumferential surface of the extrusion roll 10 to form a plenum chamber 16 in conjunction with the extrusion roll 10 and side plates 14 arranged on respective side walls of the chamber block 12.

The chamber block 12 is provided at its mid portion with a holder unit 20 which is movable toward and away from the extrusion roll 10 in radial direction thereof and which is capable of holding a mouthpiece 18 at a predetermined position relative to the extrusion roll 10. The holder unit 20 comprises a mouthpiece holder element 22 and a cylinder 24 operated with a pressurized fluid for advancing and retracting the holder element 22. An anchoring block 25 is arranged opposite to the chamber block 12, with the mouthpiece 18 therebetween, and is formed with an anchoring portion 26. The mouthpiece holder 22 is formed with a shoulder 28 having a complementary shape to the anchoring portion 26. The mouthpiece 18 can be held at a predetermined position relative to the extrusion roll 10 by causing the shoulder 28 of the mouthpiece holder 22 to abut against the anchoring portion 26. There is further provided a regulating plate 30 which prevents movement of the mouthpiece 18 in the circumferential direction of the extrusion roll 10 from its predetermined position relative to the roll 10.

On the other hand, a stock of mouthpieces 32 is arranged in a direction substantially perpendicular to the moving direction of the holder unit 20. The mouthpiece stocker 32 accommodates therein a plurality of mouthpieces 18 which are stacked in the longitudinal direction of the stocker 32. When the cylinder 24 is retracted together with the mouthpiece holder element 22, a mouthpiece held by the holder element 22 is lowered along a guide 34 arranged along the side end of the holder element 22. On the other hand, when the cylinder 24 is extended, a desired mouthpiece among the stack 36 of the mouthpieces 18 is held by the holder element 22 and brought into the desired position relative to the extrusion roll 10.

As shown in FIG. 3a, a plurality of magnets 38a to 38e, five in number in the illustrated embodiment, are embedded in each mouthpiece 18 and aligned with one another with a constant interval at least along one edge of the mouthpiece 18 in the moving direction of the holder element 22. Polarities of the respective magnets 38a to 38e of one mouthpiece 18 may be N, S, N, S, N in the direction opposite to the direction of arrow A or in the order from the forward side to the rearward side of the mouthpiece 18. It is to be noted of course that magnets for other mouthpieces have arrangements of the polarities different from that shown in FIG. 3a in order to allow for discrimination. In other words, the polarities of the magnets 38a to 38e are arranged as coded information uniquely determined in accordance with the kinds of the mouthpieces 18.

The guide 34 is positioned along the passage through which the mouthpiece 18 is advanced or retracted through advancing or retracting movement of the holder 20 unit. A detection element 40 in the form of a magnetic sensor is provided on the guide 34 opposed to the edge of the mouthpiece 18, in order to detect the magnetic fields of the magnets 38a to 38e.

Signals from the magnetic sensor 40 are fed to an amplifier 42 which is connected to a discrimination circuit 44, both included in a signal processing unit 46. The amplifier 42 in the illustrated embodiment includes at least one shift register $R_0$ to $R_4$ (not shown) which may correspond in number to the magnets 38a to 38e in a mouthpiece 18, and successively shifts a register to level "1" for input signal levels which exceeds a first threshold level, and to level "0" for input signal levels less than a second threshold level, as particularly shown in FIG. 3b.

Discrimination of the mouthpiece 18 having magnets 38a to 38e which are arranged, for example, in a manner as shown in FIG. 3a will now be explained.

First, shift registers (not shown) of the amplifier 42 are reset prior to selection of a mouthpiece. Thereafter, the selected mouthpiece 18 is moved along the passage provided with the magnetic sensor 40, toward the extrusion roll 10 by means of the holder unit 20. As the N pole of the magnet 38a forwardmost in the moving direction is on the side of the sensor 40, the register $R_0$ of the amplifier 42 is shifted to "1" on the basis of the detection signal from the sensor 40, while the other registers $R_1$ to $R_4$ remain "0".

Next, when the second magnet 38b passes by the sensor 40, the amplifier 42 determines "0" because of the S pole of the second magnet 38b. Therefore, the level "1" of the register $R_0$ is shifted to the register $R_1$, while the register $R_0$ is turned to "0". In this manner, the data in each register $R_0$ to $R_4$ is successively shifted according to the polarities of the magnets 38a to 38e of the mouthpiece 18, and it can be determined that this mouthpiece 18 is one indicated by number "10101".

Therefore, the discriminating circuit 44 compares the unique number of the mouthpiece 18 with the previously memorized number to determine whether it is the correct one or not. When this is the correct one, the holding means is allowed to exchange the mouthpieces. If it is not the correct one, an alarm may be actuated to indicate to the worker that the mouthpiece 18 is incorrect.

In the illustrated embodiment, moreover, the N pole of the magnet 38e rearmost in the advancing direction of the mouthpiece 18 is arranged on the side of the sensor 40 so that the register $R_0$ always indicates the level "1". The polarity of the rearmost magnet 38e is determined independently of the kinds of mouthpieces so that when the register $R_0$ indicates the level "1" for that magnet 38e, it can be assumed that the reading of sensor 40 has been exactly effected on all the magnets. If the reading shows that the selected mouthpiece 18 is incorrect, the reading is again carried out and only when the second reading also concludes the selected mouthpiece 18 is wrong, the alarm is actuated. In this manner, it is possible to mitigate or at least minimize malfunction of the alarm due to reading error of the sensor 40.

In the case that five magnets 38a to 38e are embedded in a mouthpiece 18, therefore, discrimination can be effected with respect to sixteen kinds ($2^4 = 16$) of mouthpieces. Moreover, while the magnets are embedded in the mouthpiece along one edge thereof in the illustrated embodiment, it will be of course that the magnets may be embedded in the mouthpiece along both edges thereof.

As can be seen from the above description, the device according to the present invention comprises magnets provided at least along one side edge of a mouthpiece to identify the mouthpiece on the basis of change in arrangement of polarities of the magnets. Even when mouthpieces are similar in shape to one another and cannot be readily identified by visual inspection, or when part of extruded material is intentionally left attached to the mouthpiece, the invention makes it possible to automatically and exactly distinguish different mouthpieces from one another.

While the present invention has been particularly shown and described with reference to certain preferred embodiments, it will be understood by those skilled in the art that the various changes in form and details can be made without departing from the spirit and scope of the invention.

What is claimed is:

1. A mouthpiece discriminating device for a rotary roll extruder comprising: a cylindrical rotary extrusion roll, an exchangeable mouthpiece movable along a predetermined passage and having a notch which is brought into cooperation with an outer circumferential surface of said rotary extrusion roll, holder means which is advanced toward said rotary extrusion roll and retracted away therefrom, for advancing and retracting said mouthpiece and for holding said mouthpiece in a predetermined position relative to said rotary roll such that a material is extruded along with rotation of said rotary extrusion roll, from said notch of said mouthpiece,

- a plurality of magnets embedded in said mouthpiece along at least one edge thereof and aligned with each other in a direction of said passage, said magnets having poles which are arranged as coded information;
- a detector element provided along said passage, for detecting magnetic fields of said magnets upon movement of said mouthpiece along said passage, and for generating output signals representing the magnetic field detected; and
- a signal processing means for discrimination said mouthpiece based on said output signals generated by said detector element.

2. The mouthpiece discriminating device as set forth in claim 1, wherein said detector element is a magnetic sensor for detecting polarities of said magnets and generating electrical output signals representing the polarities of the magnets detected.

3. The mouthpiece discriminating device as set forth in claim 1, wherein said signal processing means includes an amplifier connected to said detector element for receiving said output signals, and a discriminating circuit connected to said amplifier for comparing output signals from said amplifier with previously memorized signals so as to determine whether a correct exchange of the mouthpiece has been completed.

4. The mouthpiece discriminating device as set forth in claim 1, wherein said plurality of magnets includes a checking magnet disposed on the rearmost of said aligned magnets in a direction of the passage, said checking magnet having a predetermined polarity such that a correct reading of all the magnets of the mouthpiece is completed when said predetermined polarity of said checking magnet has been correctly detected, and wherein additional exchangeable mouthpieces are provided, each additional exchangeable mouthpiece having a plurality of aligned magnets and a checking magnet of said predetermined polarity disposed on the rearmost of said aligned magnets.

* * * * *